United States Patent
Vogel et al.

(10) Patent No.: US 6,498,924 B2
(45) Date of Patent: *Dec. 24, 2002

(54) APPARATUS FOR MEASURING THE DISTANCE BETWEEN A MOBILE STATION AND A BASE STATION IN A MOBILE RADIOCOMMUNICATIONS SYSTEM

(75) Inventors: Hélène Vogel, Meylan (FR); Michel Galligo, Paris (FR)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/179,389

(22) Filed: Oct. 27, 1998

(65) Prior Publication Data

US 2002/0155814 A1 Oct. 24, 2002

(30) Foreign Application Priority Data

Oct. 27, 1997 (FR) .......................................... 97 13434

(51) Int. Cl.$^7$ ............................................... H04M 7/20
(52) U.S. Cl. ...................................... 455/67.1; 455/115
(58) Field of Search ................................. 455/67.1, 67.6, 455/63, 65, 33.1, 440, 422, 575, 562, 456, 423, 424, 67.3, 504–506, 272, 278.1, 296, 553, 458, 457, 463, 115, 324; 542/463, 149, 189, 152, 34, 417, 442, 386, 363, 450, 457, 464, 465

(56) References Cited

U.S. PATENT DOCUMENTS

| 5,075,863 A | * | 12/1991 | Nagamune et al. ......... 364/561 |
| 5,184,135 A | | 2/1993 | Paradise |
| 5,271,034 A | * | 12/1993 | Abaunza ........................ 375/1 |
| 5,285,472 A | * | 2/1994 | Leonard et al. ................. 375/1 |
| 5,488,662 A | * | 1/1996 | Fox et al. ...................... 380/34 |
| 5,512,908 A | | 4/1996 | Herrick |
| RE35,607 E | * | 9/1997 | Nagamune et al. ......... 364/561 |
| 5,670,964 A | | 9/1997 | Dent |
| 5,748,677 A | * | 5/1998 | Kumar ........................ 375/285 |
| 5,926,133 A | * | 7/1999 | Green, Jr. .................... 342/363 |
| 5,926,768 A | * | 7/1999 | Lewiner et al. ............. 455/562 |
| 5,953,370 A | * | 9/1999 | Durrant et al. ............. 375/208 |
| 5,966,401 A | * | 10/1999 | Kumar ........................ 375/200 |
| 5,999,124 A | * | 12/1999 | Sheynblat ............... 342/357.09 |
| 6,031,490 A | * | 2/2000 | Forssen et al. ............. 342/457 |
| 6,035,202 A | * | 2/2000 | Camp, Jr. .................... 455/456 |
| 6,052,605 A | * | 4/2000 | Meredith et al. ........... 455/561 |
| 6,055,281 A | * | 4/2000 | Hendrickson et al. ...... 375/329 |

FOREIGN PATENT DOCUMENTS

EP 0 600 796 A1 6/1994

\* cited by examiner

*Primary Examiner*—Daniel Hunter
*Assistant Examiner*—Pablo Tran
(74) *Attorney, Agent, or Firm*—Sughrue Mion, PLLC

(57) ABSTRACT

Apparatus for measuring the distance between a mobile station and a base station in a mobile radio-communications system, the apparatus including a device for determining the reception instant at which the mobile station receives predetermined data transmitted by the base station, the circuit including a correlator for correlating an in-phase component and a quadrature component of a modulated signal received by the mobile station respectively with an in-phase component and a quadrature component of a reference signal generated in the mobile station and corresponding to the predetermined data, correlator delivering real components and imaginary components of correlation coefficients, and the apparatus being characterized in that it further includes a processor for using the real components and the imaginary components of the correlation coefficients to determine a complex magnitude whose phase varies continuously as a function of the reception instant.

8 Claims, 3 Drawing Sheets

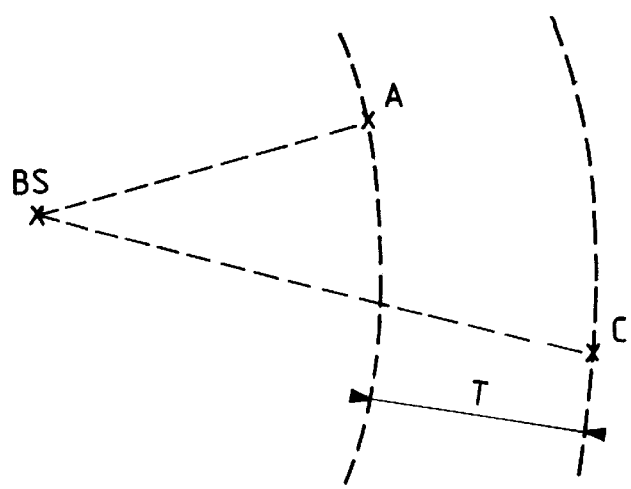
FIG_2a
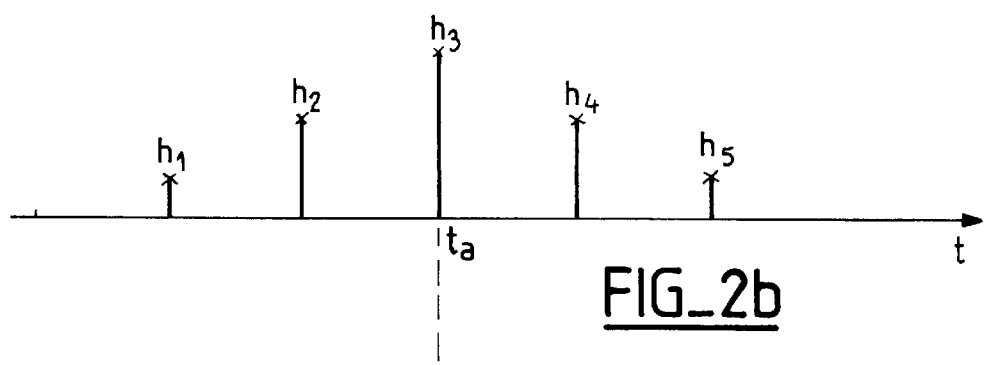
FIG_2b
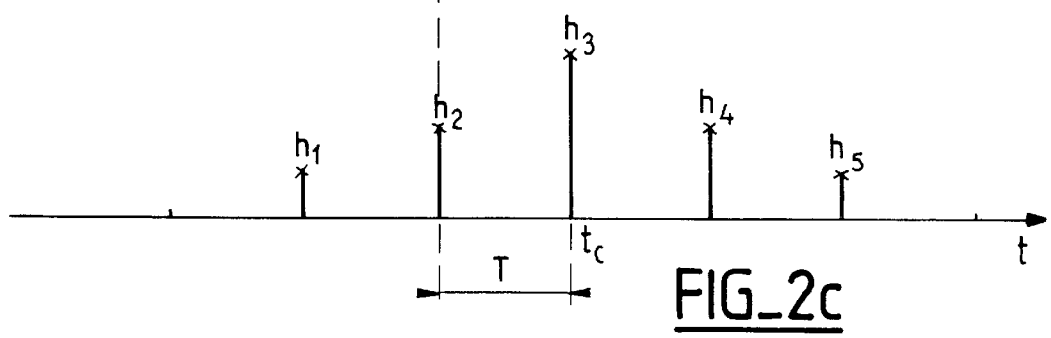
FIG_2c

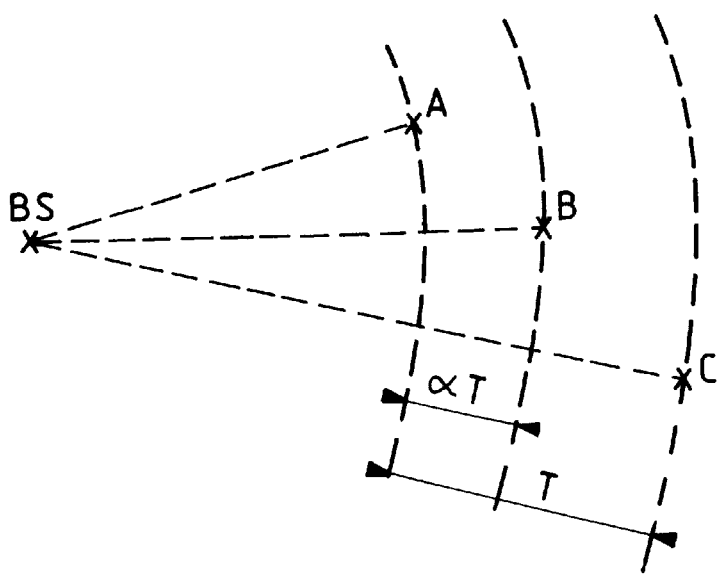
FIG_4a
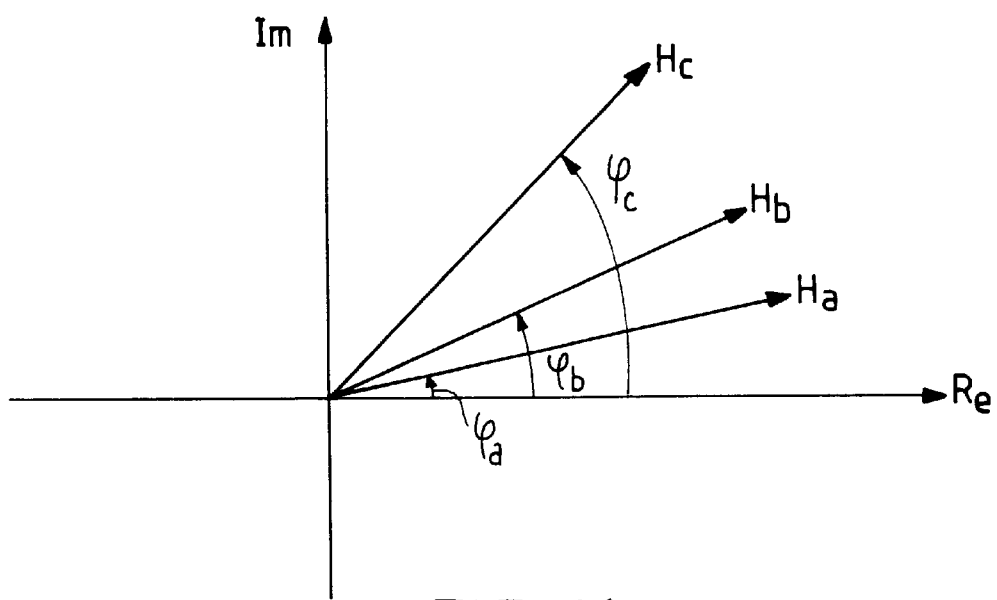
FIG_4b

APPARATUS FOR MEASURING THE DISTANCE BETWEEN A MOBILE STATION AND A BASE STATION IN A MOBILE RADIOCOMMUNICATIONS SYSTEM

BACKGROUND OF THE INVENTION

The present invention relates generally to mobile radiocommunications systems.

The present invention relates more particularly to apparatus for measuring the distance, or the propagation time, between a mobile station and a base station in such a system.

Such knowledge of distance or of propagation time can be used for various purposes, such as the following, given by way of example:

- in a mobile radiocommunications system of the Time Division Multiple Access (TDMA) type, such as in particular the Global System for Mobile communications (GSM), such knowledge can be used for the purpose of determining the timing advance to be applied to information from the mobile station so as to enable said information to be received at the base station in that one of the time channels which has been allocated to said mobile station, regardless of the propagation time between said mobile station and said base station; and
- in a mobile radiocommunications system of the cellular type (also such as the above-mentioned GSM), such knowledge can be used for the purpose of controlling the transmission power of the mobile station as a function of the distance between it and the base station so as to reduce the overall interference level in the system, or else so as to locate the mobile station, e.g. by combining the result of such a measurement of the distance between the mobile station and a base station with the results of measurements of the distances between said mobile station and other base stations.

To determine the propagation time, or the distance, between a mobile station and a base station in a mobile radiocommunications system, it is known to be possible to determine the reception instant at which predetermined data transmitted by the base station is received by the mobile station, such predetermined data being, in particular, a "training sequence" (used in known manner to estimate the transmission channel prior to equalizing the signals received over said transmission channel). Once said reception instant has been determined, the base station can be informed of it, and, by comparing it with the transmission instant at which said data was transmitted, and also given that the mobile station is synchronized continuously on the base station, said base station can deduce the propagation time, i.e. the looked-for distance.

To determine such a reception instant at which the mobile station receives predetermined data, it is also known to be possible to correlate the modulated signal as received by the mobile station with a reference signal generated in the mobile station and corresponding to said predetermined data. In known manner, such correlation is performed on signals that have been sampled and digitized, and it involves performing similarity measurements on the two signals for various positions in time of one signal relative to the other, the positions being obtained by shifting the reference signal relative to the received signal by one sampling period each time. That one of the positions for which the similarity between the two signals is the greatest is thus representative of the reception instant at which the mobile station receives said predetermined data.

Using known methods, the accuracy of an instantaneous measurement of the propagation time cannot be better than the sampling period (or the accuracy of an instantaneous measurement of distance cannot be better than the product of the sampling period multiplied by the propagation speed of the signals). By way of example, for a mobile radiocommunications system such as the above-mentioned GSM, the accuracy of such a distance measurement is thus about one kilometer.

SUMMARY OF THE INVENTION

An object of the present invention is to improve that accuracy.

The present invention provides apparatus for measuring the distance between a mobile station and a base station in a mobile radiocommunications system, said apparatus including means for determining the reception instant at which the mobile station receives predetermined data transmitted by the base station, which means themselves include correlation means for correlating an in-phase component and a quadrature component of a modulated signal received by the mobile station respectively with an in-phase component and with a quadrature component of a reference signal generated in the mobile station and corresponding to said predetermined data, said correlation means delivering real components and imaginary components of correlation coefficients, and said apparatus being characterized in that it further includes means for using the real components and the imaginary components of the correlation coefficients to determine a complex magnitude whose phase varies continuously as a function of said reception instant.

The present invention further provides a mobile station including such means for measuring the reception instant at which the mobile station receives predetermined data transmitted by a base station in a mobile radiocommunications system.

BRIEF DESCRIPTION OF THE DRAWINGS

Other objects and characteristics of the present invention appear on reading the following description of an embodiment given with reference to the accompanying drawings, in which:

FIGS. 2a, 2b, and 2c are diagrams serving to recall the principle of such distance measurement in the prior art;

FIGS. 4a and 4b are diagrams serving to explain the principle of such distance measurement in the invention.

DETAILED DESCRIPTION OF THE INVENTION

Figure 1:
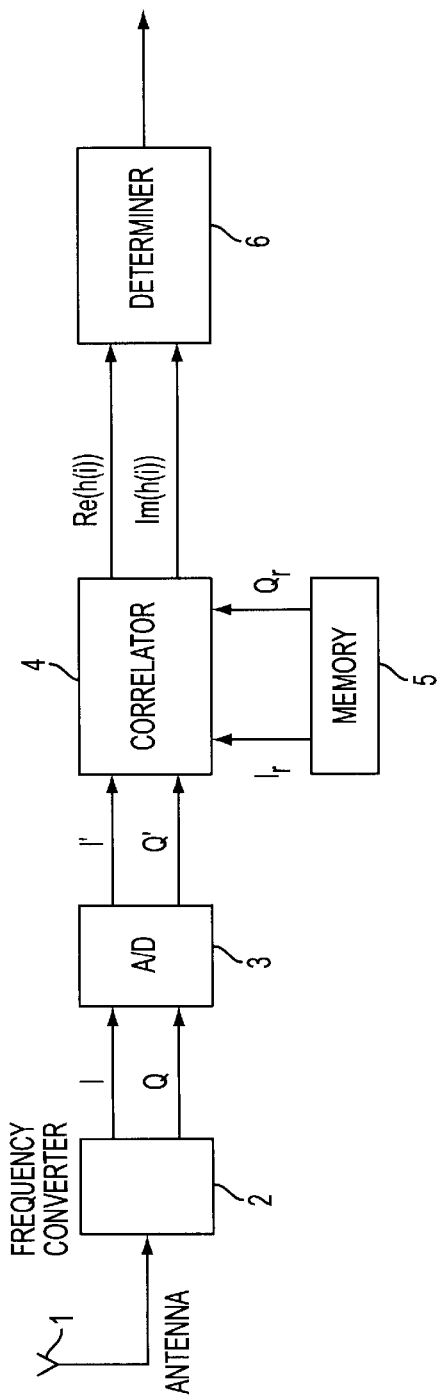
FIG. 1 is a block diagram serving to recall the type of means to be provided in a mobile station in order to measure the distance between the mobile station and a base station in the prior art.

The block diagram shown in FIG. 1 includes the following, in succession:

- an antenna 1;
- a frequency conversion stage 2 delivering, in known manner, two components, namely an in-phase component I and a quadrature component Q, of a modulated signal received by the mobile station via the antenna 1;

an analog-to-digital converter 3 delivering components I' and Q' corresponding respectively to the components I and Q; and a correlator 4 receiving the components I' and Q' corresponding to the modulated signal received by the mobile station, and also receiving an in-phase component $I_r$ and a quadrature component $Q_r$ corresponding to a reference signal generated in the mobile station and corresponding to predetermined data transmitted by the base station, the components $I_r$ and $Q_r$ being delivered by a memory 5 in this example.

The correlator 4 performs correlation on the in-phase components and correlation on the quadrature components, and it thus delivers two sets of coefficients, one of which is referenced Re(h(i)), the other one being referenced Im(h(i)), where i varies in the range 1 to k (where k designates the number of respective time positions considered of the received signal and of the reference signal), and Re(h(i)) and Im(h(i)) respectively designate the real component and the imaginary component of the correlation coefficient h(i).

The apparatus recalled in FIG. 1 further includes means 6 for determining which of the correlation coefficients h(i) is of greatest amplitude, the instant at which the coefficient is obtained thus being representative of the reception instant at which the mobile station receives said predetermined data. The base station can be informed of said reception instant, and, by comparing it with the transmission instant at which the data was transmitted, and also given that the mobile station is synchronized continuously on the base station, said base station can deduce the propagation time, i.e. the looked-for distance.

FIG. 2b shows an example of correlation coefficients h(i) obtained as a function of time t, the correlation coefficient of greatest amplitude (coefficient $h_3$ in this example) being obtained, in this example, at an instant $t_a$ corresponding to a mobile station situated, as shown in FIG. 2a, at a point A.

FIG. 2c shows another example of correlation coefficients h(i) obtained as a function of time, the correlation coefficient of greatest amplitude (also coefficient $h_3$ in this example) being obtained, in this example, at an instant $t_c$ corresponding to a mobile station situated, as shown in FIG. 2a, at a point C distant from point A by a distance corresponding to a propagation time difference equal to T (where T designates the sampling period).

In the prior art thus recalled, it is not possible to have access to a reception instant corresponding to a mobile station situated, as shown in FIG. 4a, at a point B distant from point A by a distance corresponding to a propagation time difference equal to αT (where 0<α<1), where T designates the sampling period.

With the present invention, it becomes possible to have access to such reception instants.

Figure 3:
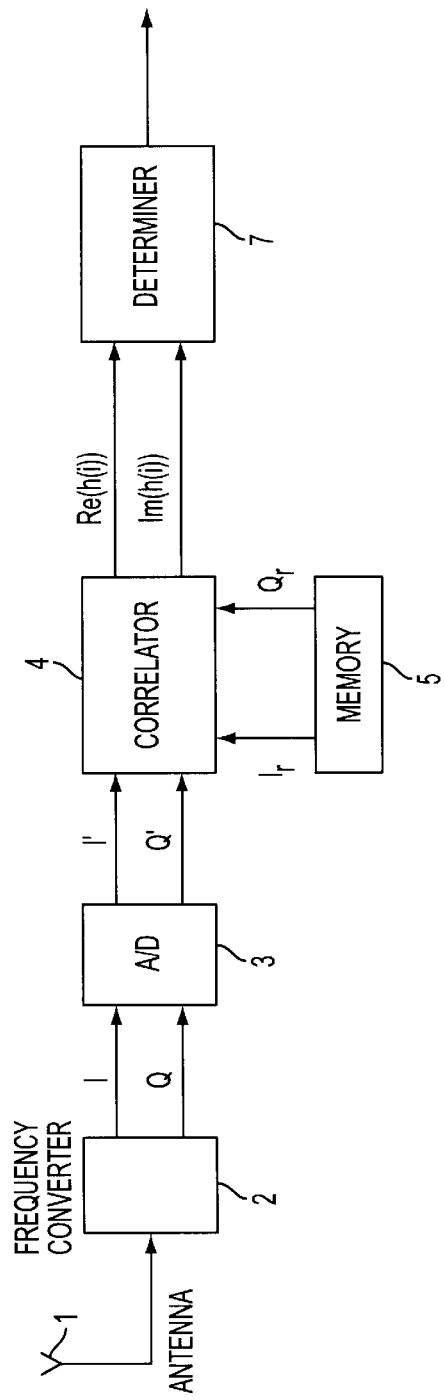
FIG. 3 is a block diagram serving to show the type of means to be provided in a mobile station in order to measure the distance between the mobile station and a base station in the invention.

As shown in FIG. 3, the apparatus of the invention differs from the apparatus shown in FIG. 1 in that, instead of including the means 6, it includes means 7 for using the real components and the imaginary components of correlation coefficients h(i) to determine a complex magnitude whose phase varies continuously as a function of said reception instant. The correlation coefficients taken into account by the means 7 may be either all of the coefficients, or only the more significant components if some of them are of too small an amplitude.

By way of example, the real component of said complex magnitude may be equal to the sum of the real components of the correlation coefficients h(i) in question, and the imaginary component of said complex magnitude may be equal to the sum of the imaginary components of the correlation coefficients h(i) in question, said complex magnitude then being written as follows:

$$\sum_i \text{Re}(h(i)) + j \cdot \sum_i \text{Im}(h(i))$$

In another example, said complex magnitude may also be equal to the sum of the moduli of the complex coefficients h(i) in question, each multiplied by the complex value exp(j.i.π/2), said complex magnitude then being written as follows:

$$\sum_i |\text{Re}(h(i)) + j \cdot \text{Im}(h(i))| \cdot \exp\left(j \cdot i \cdot \frac{\pi}{2}\right)$$

In another example applicable to both of the above examples, said sums could also be weighted sums. In other examples, functions other than sums or weighted sums can be used provided that the phase of the resulting complex magnitude varies continuously as a function of said reception instant. The variation in said complex magnitude may take place in compliance with a function that is affine or linear.

Thus, in the complex plane shown in FIG. 4b, the vector $H_a$ corresponding to the complex magnitude obtained for a mobile station located at point A forms an angle $\phi_a$ with the axis Re of the real values, the vector $H_b$ corresponding to the complex magnitude obtained for a mobile station located at point B forms an angle $\phi_b$ with the axis of the real values, and the vector $H_c$ corresponding to the complex magnitude obtained for a mobile station located at point C forms an angle $\phi_c$ with the axis of the real values, the angle $\phi$ ($\phi_a$, $\phi_b$, $\phi_c$) being, for example, a linear function of the reception instant.

It is thus possible to have access to a reception instant corresponding to a mobile station situated, as shown in FIG. 4a, at a point B distant from point A by a distance corresponding to a propagation time difference is equal to α.T (where 0<α<1), where T designates the sampling period.

The present invention thus makes it possible to obtain accuracy better than the sampling period for measuring said reception instant at which the mobile station receives predetermined data, and thus for measuring the propagation time (or the distance) between the mobile station and the base station, this accuracy then being limited only by the quality of the received signals.

What is claimed is:

1. A method for measuring the distance between a mobile station and a base station in a mobile radio communications system, comprising:

receiving a modulated signal at said mobile station having in-phase components I and quadrature components Q;

converting said modulated signal to a received digital signal having received signal components including respective in-phase components I' and respective quadrature components Q';

obtaining predetermined components including in-phase reference components Ir and predetermined quadrature reference components Qr;

correlating said received signal components with said predetermined components to provide correlation coefficients h(i), where i varies in a range of 1 to k, and k designates a number of respective time positions with respect to said received digital signal;

determining from said correlation coefficients h(i) two sets of coefficients, including a set of real components Re(h(i)) and a set of imaginary components Im(h(i));

identifying one of said correlation coefficients h(i) having a greatest correlation;

determining a first distance value based on said one of said correlation coefficients h(i) having said greatest correlation;

defining a complex plane with real and imaginary axes;

defining a vector Ha corresponding to a complex magnitude with respect to said one of said correlation coefficients h(i) having said greatest correlation;

defining a vector Hb corresponding to a complex magnitude with respect to a mobile station;

determining an angle φa of said vector Ha with respect to said real axis;

determining an angle φb of said vector Hb with respect to said real axis as a function of said real components Re(h(i)) and said imaginary components (Im(h(i));

determining a distance increment relating to the difference between φa and φb; and combining said distance increment with said first distance value to provide a final distance value representing said distance between said mobile station and said base station.

2. A method for measuring a distance between a mobile station and a base station in a mobile radio-communications system, comprising:

converting a received modulated signal, having in-phase components I and quadrature components Q, to a received digital signal having received signal components including respective in-phase components I' and respective quadrature components Q';

obtaining predetermined components including in-phase reference components Ir and quadrature reference components Qr;

correlating I and Q with Ir and Qr to provide correlation coefficients h(i), where i varies in a range of 1 to k, and k designates a number of respective time positions with respect to said received digital signal;

determining from h(i) a set of real components Re(h(i)) and a set of imaginary components Im(h(i));

determining a first distance value based on one of h(i) having a greatest correlation;

defining a vector Ha corresponding to a complex magnitude with respect to said one of h(i) having said greatest correlation, with an angle φa with respect to a real axis in a complex plane;

defining a vector Hb corresponding to a complex magnitude with respect to a mobile station, with an angle φb, with respect to said real axis, as a function of Re(h(i)) and Im(h(i));

modifying the first distance value based on a difference between φa and φb to provide a final distance value representing said distance between said mobile station and said base station.

3. The method for measuring the distance between the mobile station and the base station as set forth in claim 2, wherein the modifying of the first distance value is performed as a function of the difference between φa and φb, the function being linear or affine.

4. A mobile station for a mobile radio communications system, comprising:

a signal analyzer for:
converting a received modulated signal, having in-phase components I and quadrature components Q, to a received digital signal having received signal components including respective in-phase components I' and respective quadrature components Q', and obtaining predetermined components including in-phase reference components Ir and quadrature reference components Qr;

a correlator for:
correlating I and Q with Ir and Qr to provide correlation coefficients h(i), where i varies in a range of 1 to k, and k designates a number of respective time positions with respect to said received digital signal; and determining from h(i) a set of real components Re(h(i)) and a set of imaginary components Im(h(i)); and a coefficient processor for:
determining a first distance value based on one of h(i) having a greatest correlation, defining a vector Ha corresponding to a complex magnitude with respect to said one of h(i) having said greatest correlation, with an angle φa with respect to a real axis in a complex plane, defining a vector Hb corresponding to a complex magnitude with respect to a mobile station, with an angle φb, with respect to said real axis, as a function of Re(h(i)) and Im(h(i)), and modifying the first distance value based on a difference between to provide a final distance value representing said distance between said mobile station and said base station.

5. The mobile station for a mobile radio communications system as set forth in claim 4, wherein the coefficient processor modifies the first distance value as a function of the difference between φa and φb, the function being linear or affine.

6. A mobile station for a mobile radio communications system, comprising:

signal analysis means for:
converting a received modulated signal, having in-phase components I and quadrature components Q, to a received digital signal having received signal components including respective in-phase components I' and respective quadrature components Q', and obtaining predetermined components including in-phase reference components Ir and quadrature reference components Qr;

correlation means for:
correlating I and Q with Ir and Qr to provide correlation coefficients h(i), where i varies in a range of 1 to k, and k designates a number of respective time positions with respect to said received digital signal, and determining from h(i) a set of real components Re(h(i)) and a set of imaginary components Im(h(i)); and coefficient processing means for:
determining a first distance value based on one of h(i) having a greatest correlation, defining a vector Ha corresponding to a complex magnitude with respect to said one of h(i) having said greatest correlation, with an angle φa with respect to a real axis in a complex plane, defining a vector Hb corresponding to a complex magnitude with respect to a mobile station, with an angle φb, with respect to said real axis, as a function of Re(h(i)) and Im(h(i)), and modifying the first distance value based on a difference between to provide a final distance value representing said distance between said mobile station and said base station.

7. The mobile station for a mobile radio communications system as set forth in claim 6, wherein the coefficient processor modifies the first distance value as a function of the difference between $\phi a$ and $\phi b$, the function being linear or affine.

8. A method for measuring the distance between a mobile station and a base station in a mobile radio communications system, comprising:

converting a received modulated signal to a received digital signal having received signal components, including respective in-phase components and respective quadrature components;

obtaining predetermined reference components including in-phase reference components and predetermined quadrature reference components;

correlating said received signal and said predetermined reference components to provide correlation coefficients;

determining, from said correlation coefficients, a set of real components and a set of imaginary components;

determining a first distance value based on one of said correlation coefficients having a greatest correlation;

using the set of real components and the set of imaginary components to determine a complex magnitude, including:

determining an angle of a first vector corresponding to a complex magnitude with respect to said one of said correlation coefficients having said greatest correlation, with respect to a real axis of a complex plane;

defining an angle of a second vector corresponding to a complex magnitude with respect to a mobile station, with respect to said real axis, as a function of said sets of real and imaginary components;

determining a distance increment relating to the difference between said angles of said first and second vectors; and combining said distance increment with said first distance value to provide a final distance value representing said distance between said mobile station and said base station.

\* \* \* \* \*